(12) United States Patent
Mitchell

(10) Patent No.: US 10,240,695 B2
(45) Date of Patent: Mar. 26, 2019

(54) PENETRATION FITTING

(71) Applicant: Icon Containment Solutions, LLC, North Salt Lake, UT (US)

(72) Inventor: Jason Mitchell, North Salt Lake, UT (US)

(73) Assignee: Icon Containment Solutions, LLC, North Salt Lake, UT (US)

(*) Notice: Subject to any disclaimer, the term of this patent is extended or adjusted under 35 U.S.C. 154(b) by 311 days.

(21) Appl. No.: 15/345,314

(22) Filed: Nov. 7, 2016

(65) Prior Publication Data

US 2017/0211723 A1     Jul. 27, 2017

Related U.S. Application Data

(60) Provisional application No. 62/215,132, filed on Sep. 7, 2015.

(51) Int. Cl.
    *F16L 5/10*            (2006.01)
    *B29C 65/78*         (2006.01)
    *B29C 65/48*         (2006.01)
    *B29C 65/00*         (2006.01)
    *B29L 31/00*         (2006.01)

(52) U.S. Cl.
CPC .............. *F16L 5/10* (2013.01); *B29C 65/485* (2013.01); *B29C 65/7814* (2013.01); *B29C 65/7829* (2013.01); *B29C 66/112* (2013.01); *B29C 66/114* (2013.01); *B29C 66/118* (2013.01); *B29C 66/12421* (2013.01); *B29C 66/53241* (2013.01); *B29C 66/54* (2013.01); *B29C 66/73921* (2013.01); *B29C 66/547* (2013.01); *B29C 66/71* (2013.01); *B29C 66/7212* (2013.01); *B29L 2031/7096* (2013.01)

(58) Field of Classification Search
CPC ... F16L 5/02; F16L 5/025; F16L 5/027; F16L 5/10; F16L 5/14; B29C 65/7805; B29C 65/7808; B29C 65/7811; B29C 65/7814; B29C 65/782; B29C 65/7823; B29C 65/7826; B29C 65/7829
See application file for complete search history.

(56) References Cited

U.S. PATENT DOCUMENTS

| | | | | |
|---|---|---|---|---|
| 2008/0246276 A1* | 10/2008 | Bravo | ....................... | F16L 5/10 285/139.2 |
| 2013/0075980 A1* | 3/2013 | Yamamoto | ............. | F16J 15/025 277/591 |
| 2014/0232106 A1* | 8/2014 | Mukai | ....................... | F16L 5/02 285/194 |
| 2014/0265157 A1* | 9/2014 | Mukai | ....................... | F16L 5/08 277/606 |

* cited by examiner

*Primary Examiner* — Carson Gross
(74) *Attorney, Agent, or Firm* — Kunzler, PC

(57) ABSTRACT

Disclosed is an apparatus, a kit, and a method for repairing a sump wall pipe fitting. The apparatus may comprise first and second fitting halves for repairing a penetration fitting for a sump wall, the fitting halves having a semi-annular flange with a seal plate adapted to be sealed to the sump wall; at least one semi-cylindrical cuff that extends axially outward from surface of the semi-annular flange opposite the seal plate; and a semi-annular rib that extends radially inward from the semi-annular flange spaced at a distance between the seal plate and a rim of the at least one semi-cylindrical cuff. A dispensed bonder may also be included.

22 Claims, 7 Drawing Sheets

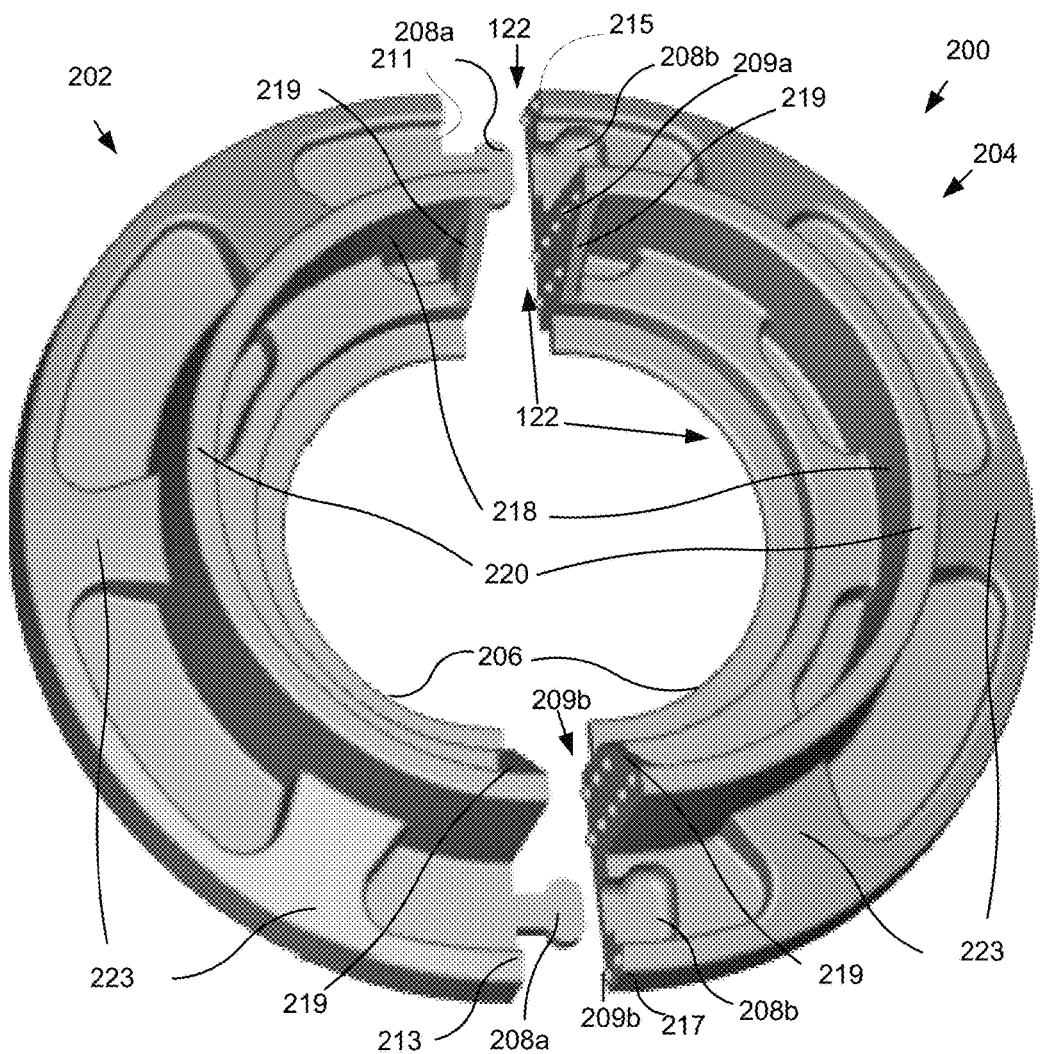
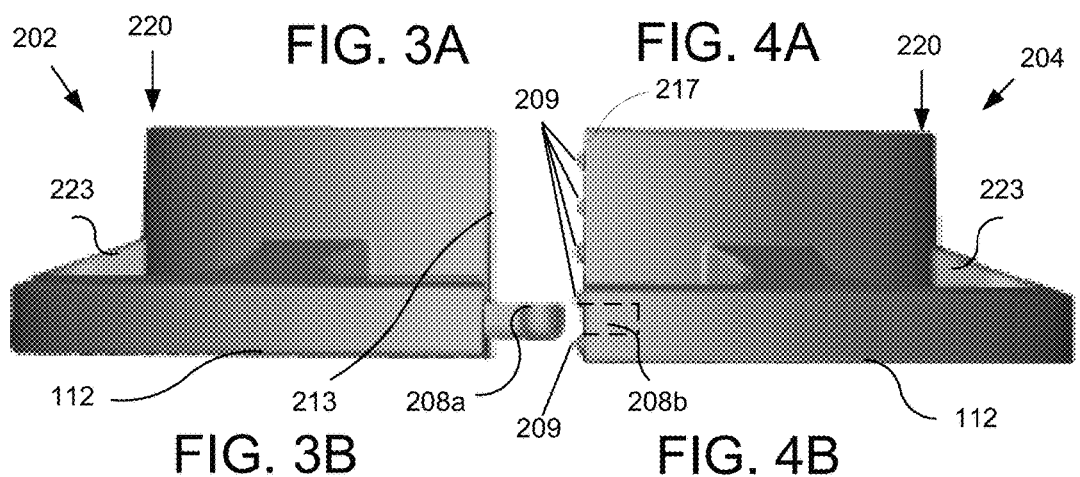

PENETRATION FITTING

CROSS-REFERENCES TO RELATED APPLICATIONS

This application claims the benefit of U.S. Provisional Patent Application No. 62/215,132 entitled "PENETRATION FITTING" and filed on Sep. 7, 2015 for Jason Mitchell, which is incorporated herein by reference.

FIELD

The subject matter disclosed herein relates pipe fittings and specifically to an apparatus, a kit, and a method for repairing a sump wall pipe fitting.

BACKGROUND

Sumps providing access for underground storage containers. Various types of fittings are used around pipes that enter through a sump wall.

BRIEF SUMMARY

In one embodiment, an apparatus is disclosed that includes a first fitting half for repairing a penetration fitting for a sump wall. The first fitting half includes a semi-annular flange having a seal plate adapted to be sealed to the sump wall. The fitting half further includes at least one semi-cylindrical cuff that extends axially outward from surface of the semi-annular flange opposite the seal plate, and a semi-annular rib that extends radially inward from the semi-annular flange spaced at a distance between the seal plate and a rim of the at least one semi-cylindrical cuff.

In one embodiment, a kit is disclosed that includes an injection molded penetration fitting made substantially of glass-filled nylon, the penetration fitting comprising a first fitting half and a second fitting half that each include a semi-annular flange having a seal plate and a semi-cylindrical cuff that extends axially outward toward a rim from the semi-annular flange. The first fitting half and the second fitting half further include a semi-annular rib that extends radially inward from the semi-annular flange from a location spaced between the seal plate surface and a rim of the cuff, wherein the second fitting half includes one or more spacers for providing a gap between the first fitting half and a second fitting half when the first fitting half is coupled to the second fitting half. The kit further includes a dispensed bonder to couple the first fitting half to the second fitting half and circumscribe a pipe that extends through a sump wall, to seal a gap between the pipe and the sump wall. The bonder may be a two-component statically-mixed bonder.

A method for sealing a gap between a pipe and a sump wall is disclosed. The method includes providing an injection molded penetration fitting including a first fitting half and a second fitting half that each include a semi-annular flange having seal plate and a semi-cylindrical cuff that extends axially outward from the semi-annular flange towards a rim. The first fitting half in the second fitting half each further include a semi-annular rib that extends radially inward from the semi-annular flange from a location spaced between the seal plate surface and the rim. In the fitting used in the method, one or more of the first fitting half and the second fitting includes one or more spacers and one or more aligners disposed at one or more ends of the one or more fitting halves. The method further includes statically mixing and dispensing a two-part bonder to couple the first and second fitting halves to one another and to seal the semi-annular rib around a pipe that passes through a sump wall. The method further includes sealing the seal plate of the first and second fitting halves to the sump wall.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3A is a 3D angled view illustrating one embodiment of a first fitting half in accordance with embodiments of the present disclosure;

FIG. 3B is a 3D side view illustrating one embodiment of the first fitting half in accordance with embodiments of the present disclosure;

FIG. 4A is a 3D angled view illustrating one embodiment of a second fitting half in accordance with embodiments of the present disclosure;

FIG. 4B is a 3D side view illustrating one embodiment of the first fitting half in accordance with embodiments of the present disclosure;

DETAILED DESCRIPTION

The subject matter of the present application has been developed in response to the present state of the art, and in particular, in response to the problems and needs in the art that have not yet been fully solved by currently available penetration fittings. Accordingly, the subject matter of the present application has been developed to provide a penetration fitting that overcomes at least some shortcomings of the prior art.

Described herein are various embodiments of a penetration fitting. In some embodiments, the penetration fitting is formed of an injection molded polymer, such as for example, glass-filled nylon. Further embodiments are described below. In particular, the described embodiments are useful for providing a penetration fitting that creates a fluid-tight seal around a pipe that passes through a sump wall. As used herein, corresponding elements of the several embodiments in the figures are referenced using corresponding numbers, unless otherwise clear from the context.

The penetration fitting, in some embodiments, is a split fitting that is capable of being installed after the pipe is installed. As used herein the term split refers to the fitting that is split into two fitting halves. In some embodiments, split This is useful for retrofitting a sump-penetrating pipe or for repairing a failed fitting without having to cut the pipe. The penetration fitting is also adapted to accommodate pipes that pass through the sump wall at various non-perpendicular angles.

Figure 1:
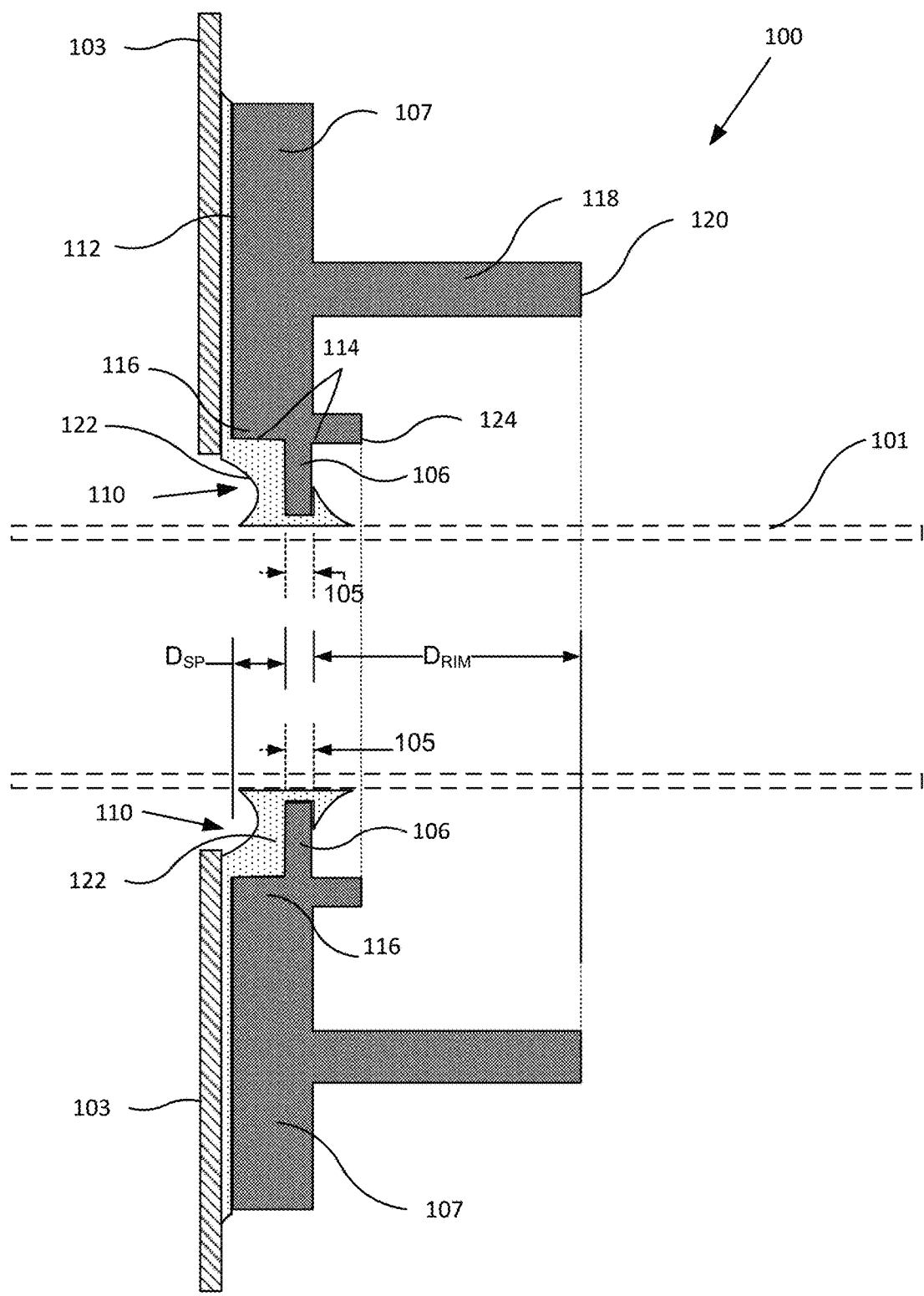
FIG. 1 is a cross-sectional view diagram illustrating one embodiment of a penetration fitting in accordance with embodiments of the present disclosure.

FIG. 1 is a cross-sectional view diagram illustrating one embodiment of a penetration fitting in accordance with embodiments of the present disclosure. The depicted embodiment illustrates how the penetration fitting (hereinafter "fitting") 100 is configured to make a mechanical seal between a pipe 101 and a sump wall 103 through which the pipe 101 passes. Often, a sump is positioned around an underground fluid tank, such as a fuel tank, to contain any fluid leakage and prevent the fluid from contaminating the ground around the underground fluid tank. Pipes that transport fluid to/from the underground fluid tank, however, must pass through the sump containment wall 103. The opening in the sump wall 103 must be sealed to prevent any accumulated fluid in the sump from escaping and contaminating the surrounding area.

Often, unlike the depiction in FIG. 1 in which the pipe 101 enters the sump wall 103 perpendicularly, one or more pipes may be installed at an angle that is not perpendicular. Beneficially, as will be discussed in greater detail below, the fitting 100 is formed with an annular flange 107 that includes an inner cuff 116 that defines an opening that is larger than the diameter of the pipe 101. The inner cuff 116 is adapted to loosely circumscribe the pipe 101, which is to say that an inner diameter of the inner cuff 116 is larger than an outer diameter of pipe 101.

The fitting 100, in one embodiment, is also formed with a second, outer cuff 118 that is attached to the annular flange 107 and extends axially outward from the annular flange 107 to a rim 120 of the outer cuff 118's. As depicted, the outer cuff 118 circumscribes the inner cuff 116. In some embodiments, outer cuff 118 may be configured for receiving a flexible boot fitting that may be attached using a hose clamp, for example. In the depicted embodiment, a thin annular rib 106 extends radially inward from the inner cuff 116 that is narrower, in a longitudinal direction indicated by distance 105, than the width of the inner cuff 116.

The thin annular rib 106 has a smaller inner diameter than does the inner cuff 116 and is adapted to closely circumscribe the pipe 101 while providing adequate clearance to accommodate a sealer/bonder. In some embodiments, the then annular rib extends 5-10 mm radially inward from an inner diameter of the annular flange 107. In other embodiments, the thin annular rib extends 2-20 mm radially inward from an inner diameter of the annular flange 107.

Accordingly, the pipe 101 may extend through the sump wall 103 at an angle in the range of between about 70 and 110 degrees and the fitting 100 is still capable of being flush mounted with the sump wall 103. Stated differently, if instead of having a thin annular rib 106, the fitting 100 had a thicker inner cuff 116 and an inner diameter that very snugly circumscribed outer diameter of the pipe 101, the fitting 100 would be substantially less capable of forming a seal with a pipe that is not perfectly orthogonal to the sump wall 103 because the inner surface 114 of the inner cuff 116 would mechanically bind the pipe 101 from entering at an angle other than about orthogonally to the fitting. If the fitting 100 were to bind a pipe entering at an angle other than orthogonal, the seal plate 112 surface would be less likely to be parallel to the sump wall 103 thus creating a risk of an improper seal.

Another benefit of the thin annular rib 106 is the formation of a cavity 110 that is bounded by the thin annular rib 106, the inner cuff 116, and the pipe 101. Depending on how the aperture in the sump wall 103 was prepared, the sump wall 103 may also at least partially form part of the cavity 110 as depicted in FIG. 1. In practice, the aperture in the sump wall 103 may have been irregularly formed, or it may have a diameter much larger than needed for the pipe 101. Regardless of whether the sump wall 103 forms part of the cavity 110 or not, an installer may fill the cavity 110 with a high-viscosity sealant and/or bonder 122. As used herein, the term sealant and the term bonder may be used interchangeably unless clearly indicated otherwise in context. Beneficially, the thin annular rib 106 retains the bonder around the pipe 101 while the bonder 122 cures.

The fitting 100 is configured to be sealed to the surface of the sump wall 103. As will become evident below, the fitting 100 includes a seal plate 112 that may be sealed to the sump wall 103. The seal plate 112 is a surface of the annular flange 107 that is substantially planar and adapted to be sealed to the sump wall 103. In some situations, the sump wall 103 may be significantly curved, thus making it difficult to seal a planar fitting evenly against the curved sump wall 103. In some embodiments, an adapter that conforms to the curvature of the sump wall 103 may be disposed between the sump wall 103 and the fitting. Such adapters may be known to one of skill in the art.

However, in other embodiments described herein if the fitting 100 is a split fitting, it may be oriented vertically with respect to a horizontal curvature of the sump wall 103 so that the fitting halves may be coupled at an obtuse angle such that the coupling point of the fitting haves may be disposed nearer to a curved sump wall 103 than is possible, for example, if a one-piece fitting with a seal plate that is substantially planar is used, or if the fitting haves were oriented horizontally with respect to the horizontal curvature of the sump wall 103 such that they could not be coupled at an obtuse angle that to conform more closely curvature of the sump wall 103. More detail is provided below with regard to how the fitting 100 is significant improvement over other split and non-split penetration fittings with respect to usage in straight or curved sump walls 103.

In the depicted embodiment, the thin annular rib 106 extends radially inward from the annular flange 107 (and is spaced at a distance between the seal plate 112 (e.g. the surface of the annular flange 107 and a rim (e.g. 124, 120) of the at least one cylindrical cuff (e.g., 106, 118) so that, in the depicted embodiment, about equal amounts of the inner surface 114 of the inner cuff (e.g., 106) are disposed on either side of the thin annular rib 106. In an alternative embodiment, the thin annular rib 106 may be formed to one side or the other of the inner cuff 116.

In some embodiments, a first distance, e.g. $D_{SP}$ between the semi-annular rib and the seal plate surface is less than a second distance, e.g. $D_{RIM}$ between the semi-annular rib and the rim of the cuff In some embodiments, the first distance, e.g. $D_{SP}$, is in a range of 2-20 mm. In other embodiments, the first distance is in a range of 5-10 mm. If the first distance $D_{SP}$ is too great, the cavity 110 will be less effective in retaining an appropriate amount of bonder, e.g. 122 to seal the fitting to the sump wall and around the pipe.

For example, the thin annular rib 106 may be positioned closer to the seal plate 112 (e.g. the surface of annular flange 107 nearest to the sump wall 103) than to a rim 124 of the inner cuff 116 or to a rim 120 of the outer cuff 118. For reference, FIG. 1 depicts the thin annular rib 106 disposed at a distance $D_{SP}$ from the plane of the seal plate 112 of the annular flange 107 to the thin annular rib 106 and at a distance $D_{RIM}$ from the rim 120 of the outer cuff 118. In some embodiments, the inner cuff 116 is merely the inner diameter of the annular flange 107 and does not include a rim 124 that extends axially outward from the annular flange 107, unlike the inner cuff 116 with rim 124 as depicted in FIG. 1.

As explained above, it may be noted by one of ordinary skill in the art that reference to an annular element in describing a fitting that is formed by coupling to fitting halves may be understood to refer to corresponding semi annular elements in the first fitting half and the second fitting half. For example, the thin annular rib 106 on depicted in FIG. 1, generally corresponds to thin annular rib 206 depicted in FIGS. 2-5, except that thin annular rib 206 is formed by coupling at first semi annular rib 206a and a second semi-annular rib 206b, and thin annular rib 206 is depicted with a symmetrically rounded nose, e.g., a full bullnose, (See FIG. 5).

Likewise, it may be noted by one of ordinary skill in the art that reference to a semi-annular element when describing a first fitting half, e.g. 202, may correspondingly refer to a semi-annular element of a second fitting half e.g. 204, unless otherwise clear from the context. Similarly, reference to a semi-annular element of one fitting half may be understood by one of ordinary skill to refer to an annular element of two fitting halves that when coupled form a fitting, unless otherwise clear from the context. It will also be clear to one of ordinary skill in the art that in any embodiments in the present disclosure or in any prior art which refer to fittings that are not split fittings, reference to an annular element would not be understood to be referring to semi-annular elements which, as used herein, clearly refer to respective fitting halves of a split fitting.

Figure 2:
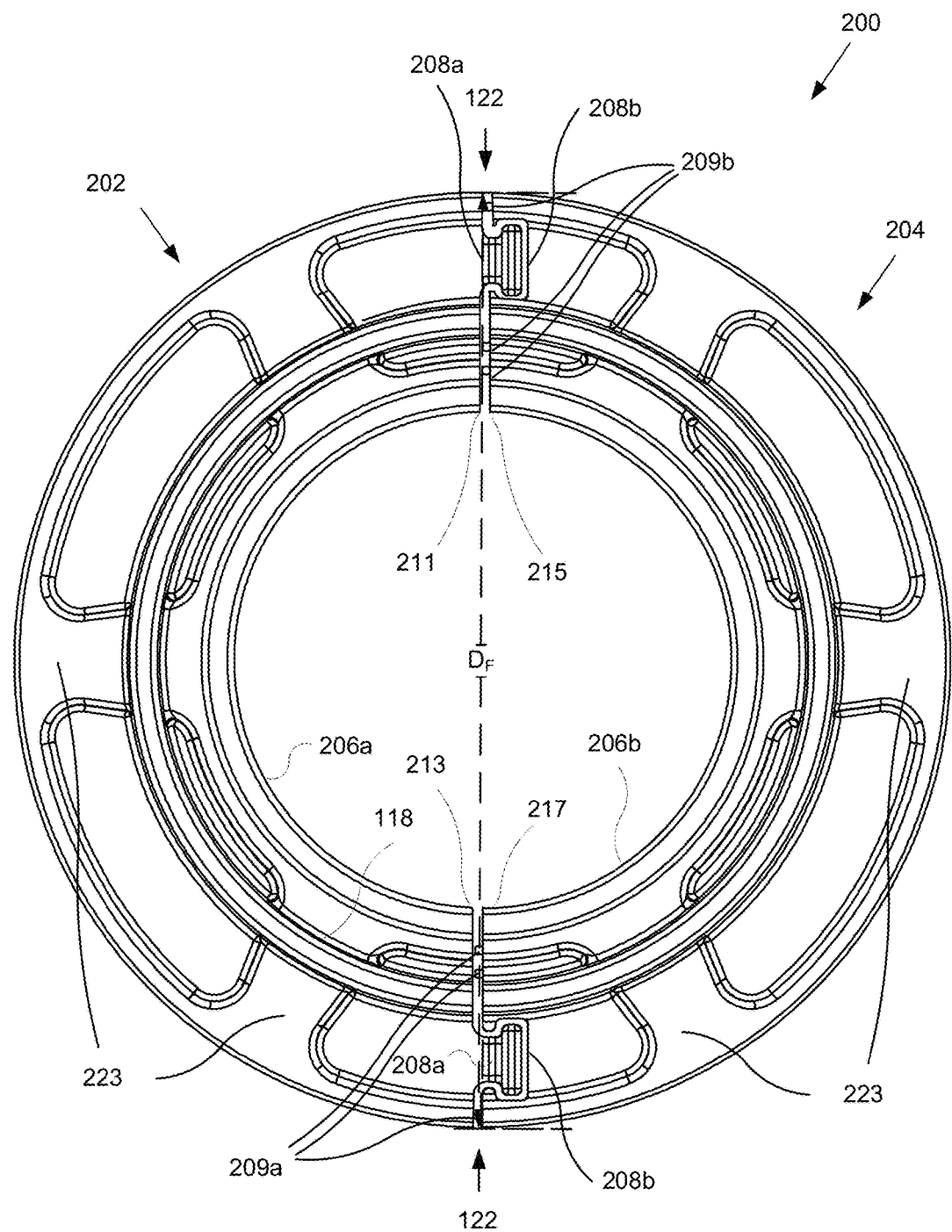
FIG. 2 is a schematic block diagram illustrating another embodiment of the fitting in accordance with embodiments of the present disclosure.

FIG. 2 is a schematic block diagram illustrating one embodiment of a fitting 200 in accordance with embodiments of the present disclosure. In one embodiment, the fitting 200 is configured to circumscribe the pipe 101 and to be sealed to the sump wall 103 (see FIG. 1). To accomplish this, for a repair and a retrofit installation, the fitting 200 may be formed of a first fitting half 202 and a second fitting half 204. Beneficially, this allows the fitting 200 to be installed without cutting or removing the pipe. The first fitting half 202 and the second fitting half 204, as will be discussed in greater detail below, are formed with coupling ends along a diameter $D_F$ of the fitting 100, that roughly divides the fitting 200 into equal fitting halves, e.g. 202, 204.

In some embodiments, one or more aligners 208 extend outward from one or more ends of the first fitting half 202 and/or the second fitting half 204. In one embodiment depicted, for example, a first type of aligner 208a that is self-locating tab that locks into a recess-type aligner 208b in the opposite fitting half In an alternative embodiment, multiple aligners 208 may be formed on the first fitting half 202, for example, and configured to engage multiple recess areas in the second fitting half 204, in the same way as in the depicted embodiment.

In other embodiments, the first type of aligner 208 such as a self-locating tab may extend from a first end 211 of the first fitting half 202 and a second type of aligner 208 such as a recess-type aligner 208a that is adapted to receive a self-locating tab aligner 208b that may be formed in a second end 213 of the first fitting half 202. In such embodiments, complementary aligners 208 may be disposed at a first and 215 of the second fitting half 204 and at a second end 217 of the second fitting half 204.

One benefit of the first fitting half 202 having a self-locating tab aligner 208a at one end e.g. 211, and a recess-type aligner 208b at the opposite end e.g. 213 of the first fitting half 202 is that the first fitting half 202 and the second fitting half 204 may be formed from the same mold, provided of course that other features are also split into the complementary fitting halves.

The fitting 200, in one embodiment, is a substantially circular fitting configured to encompass a circular pipe. In some embodiments, the fitting 200 is formed by a first fitting half 202 being coupled to a second fitting half 204 and includes a statically mixed two-part bonder that affixes the first fitting half e.g. 202 to the second fitting half e.g. 204. In some embodiments, the two-part bonder comprises methyl methacrylate.

While there are numerous choices of bonders that might be used to seal a fitting around the pipe and to a sump wall, more details provided below with respect to FIG. 6, regarding why a two-part statically mixed bonder that includes for example methyl methacrylate may be particularly synergistic with a rapidly configurable sump penetration repair split fitting as disclosed herein.

When used with a bonder 122, the fitting 200 is configured to form a seal between the pipe and the first fitting half 202 that is coupled to the second fitting half 204. Moreover, the fitting 200 is also sealed with a bonder to the sump wall to prevent fluid from escaping the sump. Additionally, the bonder and the alignment tabs bond the first fitting half 202 to the second fitting half 204 to form, essentially, a unitary fitting 200.

In some embodiments, the fitting 200 includes one or more spacers 209 that extend from one or more ends, e.g. 211, 213 of the semi-annular flange of the first fitting half 202 and/or one or more ends e.g. 215, 217 of the second fitting half 204. As with the aligners 208a, 208b, some of the one or more spacers, e.g., 209a, may extend from a first end, e.g. 215, of the second fitting half 204 and other spacers e.g., 209b may extend from the second opposite end, e.g. 217, of the second fitting half 204.

Alternatively, some of the spacers e.g. 209a may extend from one end of first fitting half 202 and other spacers e.g. 209b may extend from an opposite end of the second fitting half 204. Thus, the aligners 208 and the spacers 209 may be formed using a single mode for the first fitting half 202 and the second fitting half 204. Alternatively, different injection molds may be used to form a first fitting half 202 that differs from second fitting half 204 in the number of aligners and or spacers extending from it.

In some embodiments, the inclusion of aligners 208, spacers 209 and a thin annular rib 106 that extends radially inward from the annular flange 107 at a distance spaced from the seal plate of the annular flange 107 provides significant improvements over split fittings in which the ends of the fitting halves abut one another. For example, in embodiments in which the fitting halves 202, 204 abut one another, any attempt to flex the fitting halves 202, 204 to form an obtuse angle relative to the diameter $D_F$ such that the coupled ends of the fitting halves (e.g., near the aligners 208) may be disposed nearer to a curved sump wall, e.g. 104, may result in a breakage or leak in any sealant/bonder that has been used to couple the first fitting half 202 to the second fitting half 204. Thus in abutting embodiments and adapter plate (not shown) may be required if the sump wall e.g. 104, is too curved.

Accordingly, in other embodiments in which first fitting half 202 does not abut the second fitting half 204 but instead is spaced apart to form a gap that is capable of retaining a sealant/bonder, in which the sealant/bonder is sufficiently flexible that the fitting halves 202, 204 may be reliably configured to form an obtuse angle relative to the diameter $D_F$ such that the fitting 200 may be utilized with the curved sump wall 103 without the need for an adapter plate and without the aforementioned risk of leakage associated fitting halves that have ends that abut one another.

Figure 5:
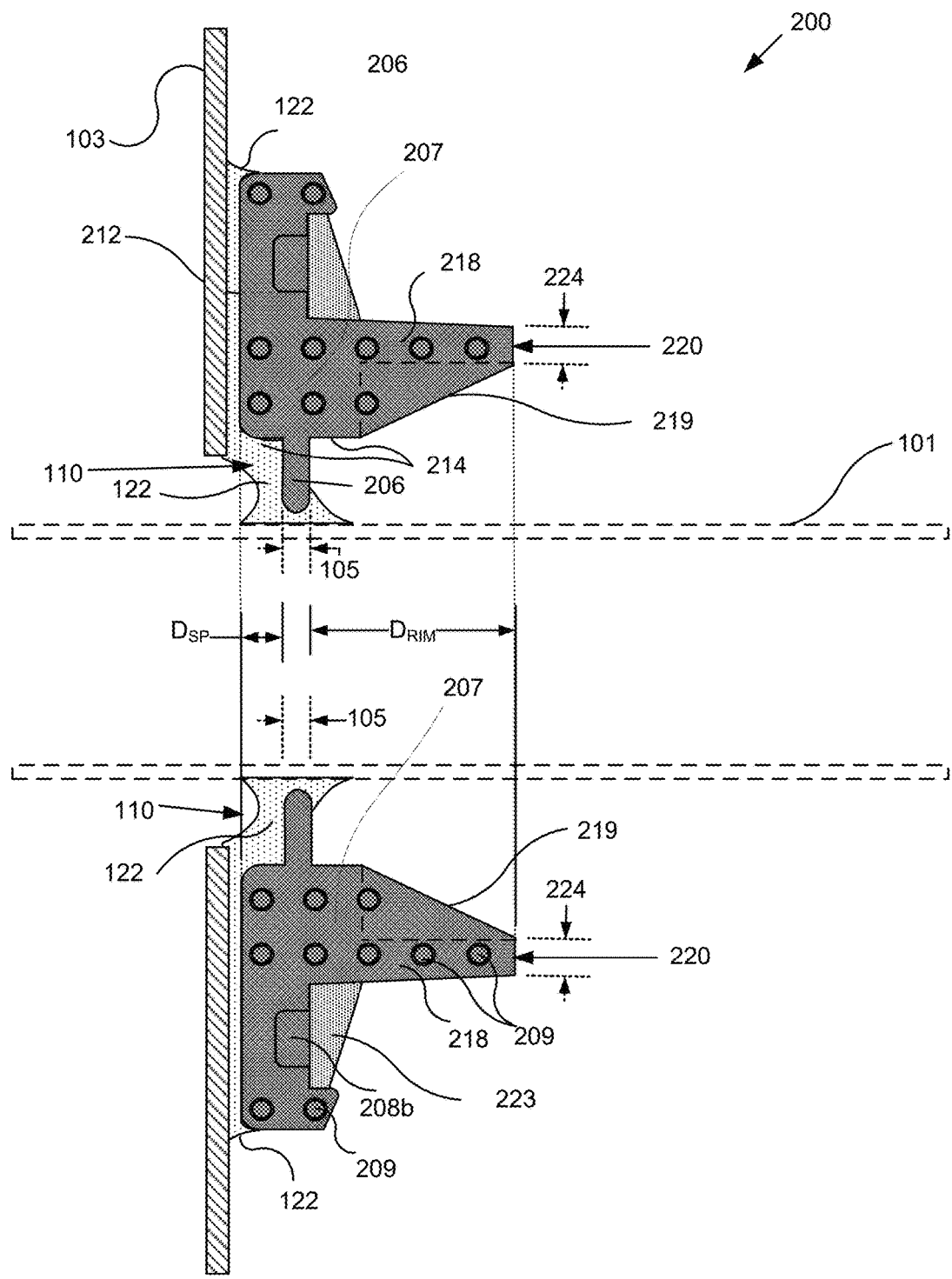
FIG. 5 is a cross-section view illustrating the penetration fitting of FIGS. 2-4B in accordance with embodiments of the present disclosure.

Moreover, because the spacers extend a gap between the first fitting half 202 and the second fitting half 204, they provide additional surface area to retain the bonder, e.g. 122, which may be the same bonder (e.g., 122) as used to seal the seal plate e.g. 112 to the sump wall 103 and to seal the thin annular rib 106 to the pipe 101 is depicted in FIGS. 1 and 5.

FIG. 3A is an angled view illustrating the fitting 200 a first fitting half 202 in accordance with embodiments of the present disclosure. In the depicted embodiment, the first fitting half 202 is a semi-annular fitting, that together with a second half, form the fitting 200 described above. The first fitting half 202 also forms a portion of the opening through which the pipe passes. In other words, the first fitting half 202 forms a semi-annular portion of the inner cuff 116 and a portion of the thin annular rib 106 that extends radially inward (towards an imaginary center of the fitting 100).

The semi-annular portion of the inner cuff 116 forms an arcuate surface. Stated another way, the first fitting half 202 forms a portion of the tube-like opening formed by the inner cuff 116 when both the first fitting half 202 and the second fitting half 204 are joined together. The inner cuff 116, when both halves are joined, forms an arcuate channel (i.e., a tube) between the planar surface that abuts the sump wall and an outer surface. The inner surfaces, e.g. as in 114 of FIG. 1, of the opposing fitting halves 202, 204 are substantially parallel. In other words, the diameter of the opening, as indicated by arrow 302 remains substantially consistent from the planar surface that abuts the sump wall to the outer surface. (See inner cuff 116 of FIG. 1).

In one embodiment, the first fitting half 202 is formed having multiple alignment tabs 208*a*. Each alignment tab 208*a* extends outward from the adjoining surface 304. In some embodiments, the adjoining surface 304 is the planar surface that faces a corresponding planar surface of the second fitting half 204. Each alignment tab 208*a* may be formed with a profile that locks into a recess in the second fitting half 204. For example, each alignment tab 208*a* may be formed as depicted. Alternatively, each alignment tab 208*a* may be formed with a geometric profile that would prevent the alignment tab 208*a* from pulling out of the recess of the second half. Those of skill in the art may recognize that many different shapes of aligners 208 may be used. In some embodiments, the aligners need not be locking and/or self-locating. For example, bumps and dimples, tongues and grooves, zigzag surfaces, and the like may all be used as aligners.

FIG. 3B depicts a side view of the first fitting half 202 of fitting 200. It may be noted as depicted in FIG. 3B that the three spokes extending radially from an inner diameter of the annular flange 107 to an outer diameter of the annular flange 107 provide strengthening support to the cuff 218 that extends axially away from annular flange 107 to the rim 220 of the cuff 218.

FIG. 4A is a schematic block diagram illustrating one embodiment of the second fitting half of the fitting in accordance with embodiments of the present disclosure. In the depicted embodiment, the second fitting half 204 is formed to substantially resemble the first fitting half 202, however, in one depicted embodiment the second fitting half 204 includes multiple recess-type aligners 208*b*, e.g., formed in the ends of the annular flange 107 that is formed by the semi-annular flange is of the first fitting half 202 and the second fitting half 204 when they are coupled to one another. In the depicted embodiment, recesses 208*b* are illustrated as extending through an outer flange portion of the annular flange 107.

Each recess-type aligner 208*b* is configured with a profile to engage a self-locating tab aligner 208*a* of the first fitting half 202. Each recess-type aligner 208*b* may be formed with a narrow, necked opening, as depicted, to prevent the alignment tab 208*a* from pulling out. The alignment tab 208*a* and the recess-type aligner 208*b* are especially useful for maintaining the position of the first fitting half 202 with respect to the position of the second fitting half 204 while the bonder bonds the first and second fitting halves 202, 204 together around the pipe e.g., 101 and seals them to the pipe e.g., 101.

FIG. 4B depicts a side view of the second fitting half 202 of fitting 200. It may be noted in FIG. 4B that the spacers 209 are depicted as extending from the second end e.g., 217 of the second fitting half 204. This depiction is not to suggest that spacers 209 may not also extend from the first end 219 of the second fitting half 204, rather it is drawn and referenced from a particular side view merely for convenience and that as described above, one or more spacers of various number, size, kind, and shape may be incorporated into one or more ends of one or more fitting haves.

FIG. 5 is a cross-section view illustrating one embodiment of a fitting 200 in accordance with embodiments of the present disclosure. In the depicted embodiment, fitting 200 includes an annular flange 107 with a seal plate 112 that is adapted to be sealed to a sump wall 103. The fitting 200 is substantially as described above with respect to FIGS. 2, 3A, 3B, 4A, and 4B.

Additionally, FIG. 5 provides a detailed view of the thin annular rib 206 that extends radially inward from the annular flange 207. In particular it may be noted that the thin annular rim 206 has a symmetrically rounded nose, i.e., a full bullnose. One of the significant improvements of the fitting 200 is that it is adapted to be installed very rapidly using a dispenser with a static mixing tip to dispense a two-component bonder.

The rounded nose of the thin annular rib 206 facilitates rapid dispensing of the bonder 122 as the dispenser tip glides smoothly around the perimeter of the thin annular rib 206 to seal the pipe to the thin annular rib 206. Moreover, because the nose is rounded rather than beveled or tapered, in situations where the fitting pushed toward the sump while 103 at the coupling point of the first fitting half 202 and the second fitting half 204, so as to be sealed to a sump wall 103 that is curved, the rounded nose easily adjusts to the angle rather than binding as a tapered or beveled fitting would do.

Moreover, in the embodiment depicted, the fitting 200 includes one or more reinforcing plates 219 that extend from the cuff 218 and the annular flange 207 at the first and second ends, e.g. 211, 213, of the first fitting half 202 and the first and second ends e.g. 215, 217 of second fitting half 204. As depicted in FIGS. 3A, 4A, and 5. The triangular-shaped of the reinforcing plates 219 uses little material, is easily molded, and provides significant additional strength to the cuff 218 at the ends of the fitting halves, e.g. 211, 213, 215, 217. As can be seen, spacers 209 in addition to extending from the ends of the annular flange 207 and the cuff 218 may also extend from the reinforcing plates 219, thus providing additional surface area for the bonder 122.

In one embodiment, the fitting halves 202 and 204 are formed substantially as shown and described above with respect to FIGS. 2, 3A, 3B, 4A, and 4B. However, in other embodiments, each fitting half 202, 204 may be identically formed. In other words, each fitting half 202, 204 may be formed with both a self-locating tab aligner 208a and a recess-type aligner 208b. This beneficially reduces manufacturing costs as only one mold is required to manufacture each fitting.

Figure 6:
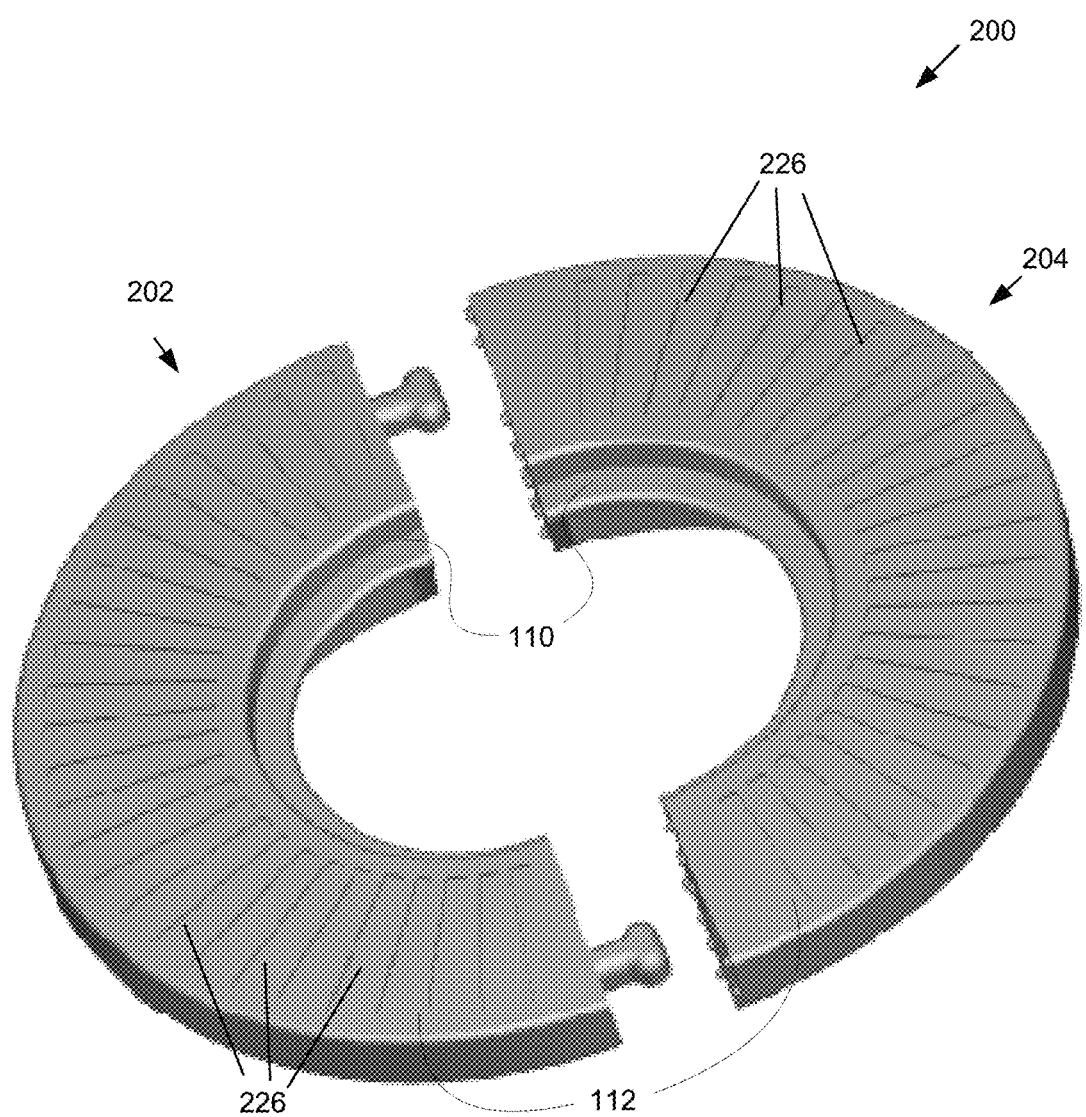
FIG. 6 is a 3D bottom view of the embodiment of FIG. 5 in accordance with embodiments of the present disclosure.

FIG. 6 is an angled bottom view diagram illustrating another embodiment of the fitting 200 in accordance with embodiments of the present disclosure. In the depicted embodiment, various surface features are visible that either add strength to the fitting, strength to the bond/seal, and/or are aesthetic. In some embodiments, the seal plate 112 includes a two or more radially extending grooves adapted to accommodate a predetermined portion of a two-part statically mixed bonder, For example, the first fitting half 202 and the second fitting half 204 may include one or more grooves 226 in the seal plate 112. The bonder e.g. 122 is in one embodiment provided in a dispenser, from which it is dispensed into and around the grooves 226 and pressed towards the sump wall, e.g. 103. The grooves provide additional surface area and help ensure that the seal plate 112 is securely sealed to the sump wall, e.g. 103.

In some embodiments, the fitting 200 may be formed of an injection molded polymer. In some embodiments, the first and second fitting halves 202, 204 consist essentially of a polymer comprising a predetermined percentage of glass/mineral fiber. In some embodiments, the predetermined percentage of glass/mineral fiber in the polymer is in a range of 15% to 45%. In other embodiments the predetermined range of glass fiber in the polymer is in a range of 27-33%. For example, in one embodiment the fitting 200 nylon is formed of 30% glass-filled nylon which is lightweight and strong.

Moreover, the polymer may be glass-reinforced, e.g. glass and or mineral fibers may be chemically bonded to the polymer to provide further improvements to the strength of the fitting 200 with increase to the size or weight. One example of a glass/mineral reinforced nylon is Minion® produced by DuPont of Wilmington, Del.

Other injection moldable, high strength and high abrasion/impact resistant thermoplastics may be used such as for example polyamide, acetal homopolymers, acetal copolymers, polyester, polycarbonate, polyphenylene oxide, and polyethersulphone. Additionally, any thermoplastic that is chemically resistant to petro-chemicals (i.e., oil, gas, transmission fluid, methanol, etc.) may be used. One example of a suitable material for use with embodiments of the present disclosure is Zytel® produced by DuPont of Wilmington, Del.

In some embodiments, a kit may be provided that includes an injection molded penetration fitting, e.g. 200, made substantially of glass filled nylon. The penetration fitting, e.g. 200 includes a first fitting half, e.g. 202 and a second fitting half e.g. 204 that each include a semi-annular flange 207 a semi-annular flange having a seal plate and a semi-cylindrical cuff that extends axially outward toward a rim from the semi-annular flange. The fitting halves, e.g. 202, 204 may further include one or more aligners disposed at one or more ends e.g. 211, 213, 215, 217 of the semi-annular flange. The fitting halves, e.g. to a two, 204 further includes a semi-annular rib that extends radially inward from the semi-annular flange from a location spaced between the seal plate surface and a rim 220 of the cuff 218, wherein the first fitting half, e.g. 202 comprises one or more spacers for providing a gap between the first fitting half, e.g. 202, and a second fitting half, e.g. 204, when the first fitting half is coupled to the second fitting half.

In the embodiment, the kit further includes a bonder, e.g. 122, to bind the first fitting half to the second fitting half to circumferentially encompass a pipe that extends through a sump wall and to seal a gap between the pipe, e.g. 101 and the sump wall, e.g. 103. The bonder may be dispensed directly from a dispenser. Additionally, in some embodiments, the bonder may be a two-component statically-mixed bonder. In some embodiments, the two-part bonder includes methyl methacrylate. One of ordinary skill in the art might select from a wide variety of bonders when sealing a penetration fitting around the pipe that passes through a sump wall.

However, statically mixed methyl methacrylate may be less suitable for existing fittings known prior to the embodiments disclosed herein because the mechanical procedures associated with existing fittings for applying the bonder to the fitting, putting the fitting in place around the pipe, affixing the fitting to the sump wall may take longer with existing fittings than they do with the embodiments of the split fitting, e.g. 200 disclosed herein. Accordingly, statically mixed methyl methacrylate may be uniquely advantageous for the fittings disclosed which may be assembled and positioned very rapidly, thus reducing the risk of the bonder hardening prematurely.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Figure 7:
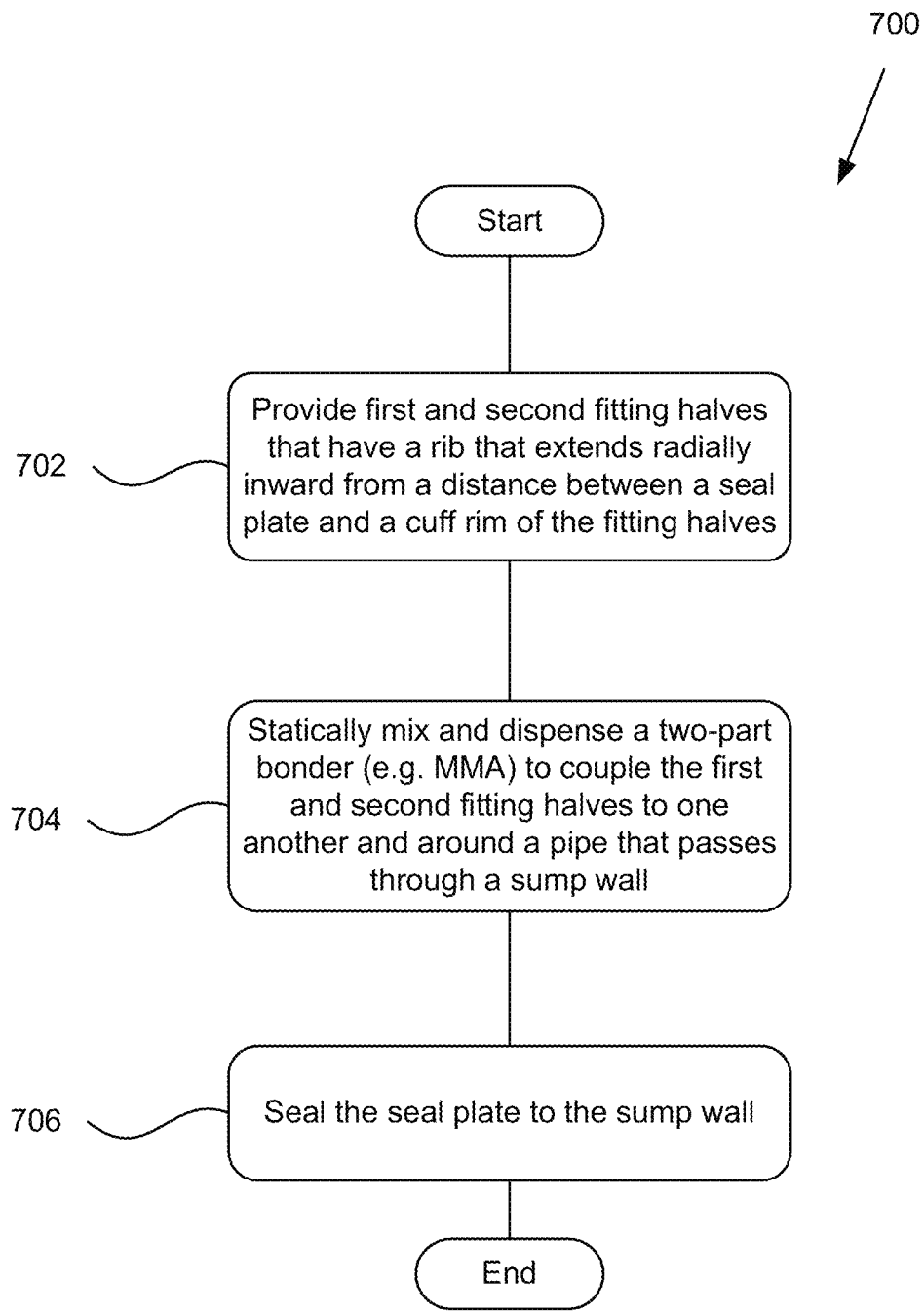
FIG. 7 is a schematic flow chart diagram illustrating one embodiment of a method of sealing a sump wall using the first and second fitting halves.

FIG. 7 discloses a method 700, for rapidly repairing a sump wall fitting. The method begins and includes providing 702 an injection molded penetration fitting that includes a first fitting half and a second fitting half that each include a semi-annular flange having a seal plate and a semi-cylindrical cuff that extends axially outward from the semi-annular flange towards a rim. The first fitting half in the second fitting half may further each include a semi-annular rib that extends radially inward from the semi-annular flange from a location spaced between the seal plate and the rim wherein, one or more of the first fitting half and the second fitting comprise one or more spacers and one or more aligners disposed at one or more ends of the one or more fitting halves.

The method 700 continues and further includes statically mixing and dispensing 704 a two-part bonder to couple the first and second fitting halves to one another and to seal the semi-annular rib around a pipe that passes through a sump wall. The method 700 continues and further includes sealing 706 the seal plate of the first and second fitting halves to the sump wall, and the method 700 ends. The steps of providing 702 a fitting, statically mixing and dispensing 704, and sealing 706 may be performed as described above with respect to any of the FIGS. 1, 2, 3A, 4A, 5, and/or 6 using the fittings 100, 200 and the statically mixed bonder 122 as described and depicted therein.

Figure 8:
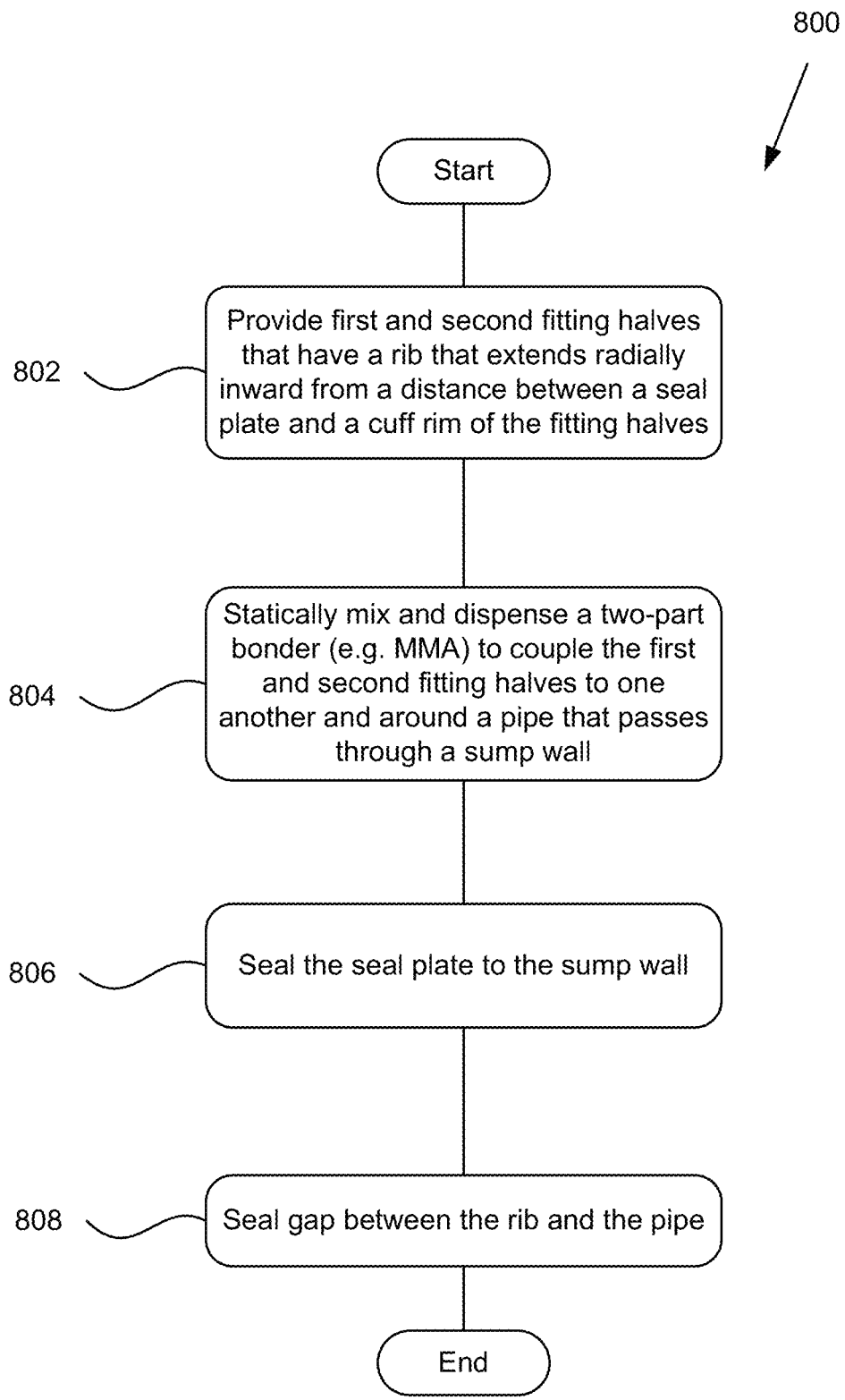
FIG. 8 is a schematic flow chart diagram illustrating another embodiment of a method of sealing a sump wall using the first and second fitting halves.

FIG. 8 is a schematic flow chart diagram illustrating another embodiment of a method of sealing a sump wall using the first and second fitting halves. The method 800 begins and includes providing 802 a fitting substantially as described above with respect to the providing 702 of method 700 described with respect to FIG. 7. The method 800 continues and includes statically mixing and dispensing 804 a two-part bonder substantially as described above with respect to the mixing and dispensing 704 of method 700 described with respect to FIG. 7. The method 800 continues and includes sealing 806 the seal plate to the sump wall substantially as with step 706 as described above with respect to FIG. 7.

It may be noted that for both method 700 and method 800 the uniquely flexible coupling of some of the embodiments disclosed herein when the ends of the flanges are aligned vertically may provide significant improvements as described above with respect to sealing sump walls that are curved without using an adapter plate between the fitting on the sump wall. The method 800 continues and includes 808 sealing the gap between the rib and the pipe. In some embodiments, after the first application of bonder has set, additional bonder may be applied around the pipe near the annular rib to ensure effective sealing, and the method 800 ends.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Furthermore, the details, including the features, structures, or characteristics, of the subject matter described herein may be combined in any suitable manner in one or more embodiments. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a first fitting half for repairing a penetration fitting for a sump wall, the first fitting half comprising:
        a semi-annular flange having a seal plate adapted to be sealed to the sump wall;
        at least one semi-cylindrical cuff that extends axially outward from surface of the semi-annular flange opposite the seal plate; and
        a semi-annular rib that extends radially inward from the semi-annular flange spaced at a distance between the seal plate and a rim of the at least one semi-cylindrical cuff.

2. The apparatus of claim 1, wherein a first distance between the semi-annular rib and the seal plate is less than a second distance between the semi-annular rib and the rim of the cuff.

3. The apparatus of claim 2, wherein the first distance is in a range of 2-20 mm.

4. The apparatus of claim 2, wherein the first distance is in a range of 5-10 mm.

5. The apparatus of claim 2, wherein the semi-annular rib extends 5-10 mm radially inward from an inner diameter of the semi-annular flange.

6. The apparatus of claim 2 wherein the semi-annular rib extends 2-20 mm radially inward from an inner diameter of the semi-annular flange.

7. The apparatus of claim 1, further comprising:
    a statically mixed two-part bonder that affixes the first fitting half to a second fitting half.

8. The apparatus of claim 7, wherein the statically mixed two-part bonder comprises methyl methacrylate.

9. The apparatus of claim 1, further comprising:
    one or more aligners that extend from one or more ends of the semi-annular flange of the first fitting half.

10. The apparatus of claim 9, wherein the one or more aligners are selected from the group consisting of self-aligning tabs and receptacles for self-aligning tabs.

11. The apparatus of claim 1, further comprising:
    one or more spacers that extend from the first fitting half for providing a gap between the first fitting half and a second fitting half when the first fitting half is coupled to the second fitting half.

12. The apparatus of claim 1, wherein the seal plate comprises a plurality of radially extending grooves adapted to accommodate a predetermined portion of a two-part bonder.

13. The apparatus of claim 1 wherein the first fitting half is an injection molded polymer.

14. The apparatus of claim 13, wherein the first fitting half consists essentially of a polymer comprising a predetermined percentage of glass-fiber.

15. The apparatus of claim 14 wherein the polymer is chosen from the group consisting of polyamide, acetal homopolymers, acetal copolymers, polyester, polycarbonate, polyphenylene oxide, and polyethersulphone.

16. The apparatus of claim 15, wherein polymer is selected from the group consisting of glass-filled polymer and glass-reinforced polymer.

17. The apparatus of claim 16, wherein the predetermined percentage of glass-fiber in the polymer is in a range of 15-66%.

18. The apparatus of claim 16, wherein the predetermined percentage of glass-fiber in the polymer is in a range of 27-33%.

19. A kit comprising:
an injection molded penetration fitting made substantially of glass filled nylon, the penetration fitting comprising a first fitting half and a second fitting half that each comprise:
a semi-annular flange having a seal plate and a semi-cylindrical cuff that extends axially outward toward a rim from the semi-annular flange;
a semi-annular rib that extends radially inward from the semi-annular flange from a location spaced between the seal plate and the rim; and
wherein the second fitting half comprises one or more spacers for providing a gap between the first fitting half and a second fitting half when the first fitting half is coupled to the second fitting half; and
a dispensed bonder to couple the first fitting half to the second fitting half and circumscribe a pipe that extends through a sump wall, to seal a gap between the pipe and the sump wall.

20. The kit of claim 19, wherein the dispensed bonder is a two-component statically-mixed bonder.

21. A method comprising:
providing an injection molded penetration fitting comprising a first fitting half and a second fitting half that each comprise:
a semi-annular flange having a seal plate and a semi-cylindrical cuff that extends axially outward from the semi-annular flange towards a rim;
a semi-annular rib that extends radially inward from the semi-annular flange from a location spaced between the seal plate and the rim; and
wherein, one or more of the first fitting half and the second fitting half comprise one or more spacers and one or more aligners disposed at one or more ends of the one or more fitting halves;
statically mixing and dispensing a two-part bonder to couple the first and second fitting halves to one another and to seal the semi-annular rib around a pipe that passes through a sump wall; and
sealing the seal plate of the first and second fitting halves to the sump wall.

22. The method of claim 21, further comprising:
sealing a gap between the coupled fitting halves and the pipe by statically mixed and dispensing a two-part bonder between an inside diameter of the semi-annular ribs of the first and second fitting halves and the pipe.

* * * * *